United States Patent
Kim et al.

(10) Patent No.: US 11,850,903 B1
(45) Date of Patent: Dec. 26, 2023

(54) VEHICLE HEIGHT ADJUSTER

(71) Applicants: Hyundai Motor Company, Seoul (KR); Kia Corporation, Seoul (KR); HYUNDAI MOBIS CO., LTD., Seoul (KR)

(72) Inventors: Jae Hun Kim, Hwaseong-Si (KR); Hee Hoon Son, Suwon-Si (KR)

(73) Assignees: Hyundai Motor Company, Seoul (KR); Kia Corporation, Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/977,997

(22) Filed: Oct. 31, 2022

(30) Foreign Application Priority Data

Jun. 30, 2022 (KR) .......................... 10-2022-0080518

(51) Int. Cl.
*B60G 17/015* (2006.01)
*B60G 11/08* (2006.01)

(52) U.S. Cl.
CPC ............ *B60G 17/015* (2013.01); *B60G 11/08* (2013.01); *B60G 2500/30* (2013.01); *B60G 2800/914* (2013.01)

(58) Field of Classification Search
CPC .. B60G 17/015; B60G 11/08; B60G 2500/30; B60G 2800/914
See application file for complete search history.

(56) References Cited

U.S. PATENT DOCUMENTS

| | | | | |
|---|---|---|---|---|
| 4,828,237 A * | 5/1989 | Neff | .................... | B60G 15/062 267/221 |
| 10,940,729 B2 * | 3/2021 | Meier | ..................... | B60G 3/28 |
| 2016/0195153 A1 * | 7/2016 | Teraoka | ................... | F16F 9/49 188/284 |
| 2018/0229567 A1 * | 8/2018 | Keeler | .................. | B60G 11/04 |
| 2018/0354329 A1 * | 12/2018 | Zhang | ................... | B60G 11/08 |
| 2018/0370315 A1 * | 12/2018 | Higle | ..................... | B60G 11/44 |
| 2019/0283517 A1 * | 9/2019 | Battaglia | ............... | B60G 17/02 |
| 2019/0308484 A1 * | 10/2019 | Belter | .................. | B60G 17/033 |
| 2019/0359022 A1 * | 11/2019 | Patel | ...................... | B60G 11/10 |
| 2020/0198432 A1 * | 6/2020 | Tate | .................... | B60G 17/0157 |
| 2021/0094376 A1 * | 4/2021 | Smith | ................... | B60W 40/10 |
| 2022/0134825 A1 * | 5/2022 | Schiwiora | ................ | F16F 1/30 280/124.174 |

(Continued)

FOREIGN PATENT DOCUMENTS

DE 102014205635 A1 * 10/2015 ............ B60G 11/08
JP 1997-011719 1/1997

(Continued)

*Primary Examiner* — Paul N Dickson
*Assistant Examiner* — Shams Dhanani
(74) *Attorney, Agent, or Firm* — MORGAN, LEWIS & BOCKIUS LLP

(57) ABSTRACT

A vehicle height adjuster includes an actuator provided to form vertical linear displacement between a leaf spring and a suspension arm, a power source connected to the actuator and configured to provide power to drive the actuator, a vehicle height sensor provided to detect a change in a height of the suspension arm relative to a vehicle body, and a controller connected to the vehicle height sensor and the power source and configured to receive a signal from the vehicle height sensor and to control the power source to drive the actuator.

16 Claims, 6 Drawing Sheets

(56) References Cited

U.S. PATENT DOCUMENTS

2022/0161626 A1\* 5/2022 Hwang .............. B60G 17/0157
2022/0379677 A1\* 12/2022 Lusso .................... F16F 9/065
2023/0041250 A1\* 2/2023 Bounds ................ F16F 9/0454

FOREIGN PATENT DOCUMENTS

| JP | 2001-121938 | 5/2001 |
| JP | 6963517 | 11/2021 |
| KR | 10-2000-0075027 | 12/2000 |
| KR | 10-2017-0050214 | 5/2017 |
| KR | 10-2022-0052646 | 4/2022 |
| WO | WO2017-153107 | 9/2017 |

\* cited by examiner

VEHICLE HEIGHT ADJUSTER

CROSS REFERENCE TO RELATED APPLICATION

The present application claims priority to Korean Patent Application No. 10-2022-0080518, filed on Jun. 30, 2022, the entire contents of which is incorporated herein for all purposes by this reference.

BACKGROUND OF THE PRESENT DISCLOSURE

Field of the Present Disclosure

The present disclosure relates to a vehicle height adjuster, and more particularly, to a vehicle height adjuster for adjusting the height of a vehicle.

Description of Related Art

A vehicle suspension system is generally constructed by mounting a suspension spring and a shock absorber in parallel between the wheels and the vehicle body, and the height of a vehicle that utilizes a simple mechanical spring with a constant spring constant, such as a leaf spring or a coil spring, as a suspension spring changes depending on the load on the vehicle.

When the height of a vehicle corresponds with a designed appropriate height independent of the load being carried, a stylish exterior design may be achieved in accordance with the design intent, and it is also advantageous for the driver's proper visibility.

Furthermore, it is preferable that the height of a vehicle varies according to the condition of the road on which the vehicle is traveling.

That is, on roads where high-speed driving is possible, the vehicle height may be secured relatively low to reduce air resistance, improving fuel efficiency and lowering the center of gravity to improve vehicle driving stability. On the other hand, in driving situations such as driving on rough roads or unpaved roads, it is possible to prevent damage to the underside of the vehicle by raising the vehicle height.

Moreover, the vehicle height adjustment can offer other benefits such as facilitating the driver or passengers to board and deboard the vehicle more easily.

Meanwhile, there is a vehicle using a transverse leaf spring mounted long in the transverse direction of the vehicle body as a suspension spring, and the wheels on both sides of the vehicle are connected to both end portions of the transverse leaf spring through a suspension arm.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle height adjuster that, by making it possible to properly adjust the height of a vehicle using a transverse leaf spring as a suspension spring according to the design purpose of the vehicle, allows the exterior design of the vehicle to be beautifully expressed, enables the driver to secure an appropriate field of vision, and seeks to improve fuel efficiency, secure driving stability, prevent damage to the vehicle, and improve convenience in getting on or off by adjusting the vehicle height according to the driving situation.

In various aspects of the present disclosure, according to various exemplary embodiments of the present disclosure, there is provided a vehicle height adjuster including: an actuator provided to form vertical linear displacement between a leaf spring and a suspension arm; a power source connected to the actuator and configured to provide power to drive the actuator; a vehicle height sensor provided to detect a change in a height of the suspension arm relative to a vehicle body; and a controller connected to the vehicle height sensor and the power source and configured to receive a signal from the vehicle height sensor and to control the power source to drive the actuator.

The actuator may include a hydraulic cylinder provided between the leaf spring and the suspension arm, and the power source may include a hydraulic pump configured to generate hydraulic pressure to be provided to the hydraulic cylinder.

The hydraulic cylinder may include: a cylinder fixed to the suspension arm; and a piston slidably mounted in the cylinder, configured for linear sliding up and down in the cylinder and provided with a spring seat for supporting an end portion of the leaf spring on an upper side of the piston.

At least one protruding end portion may be provided on an external circumferential surface of the piston, and a cylinder cover may be provided on an upper side of the cylinder to restrict the protruding end portion from being separated from the cylinder while guiding the linear sliding of the piston.

A first guide ring for guiding the linear sliding of the piston with respect to the cylinder may be provided at the protruding end portion of the piston, and a second guide ring for guiding the linear sliding of the piston may be provided at the cylinder cover.

The cylinder cover may be further provided with a dust seal for preventing dust from entering an upper side of the second guide ring.

The piston may have a ventilation hole for fluidically-communicating a space between the first guide ring and the cylinder cover with an internal space of the piston.

Between the cylinder cover and the piston, a bellows boot for blocking a gap between the cylinder cover and the piston from an outside thereof while allowing a linear displacement of the piston with respect to the cylinder may be provided.

The cylinder may be formed with a flow path to supply hydraulic pressure toward a lower end portion of the piston, and at the lower end portion of the piston, a hydraulic cup with a center portion recessed upward may be formed, so that even when the lower end portion of the piston contacts with the cylinder, the flow path is not blocked by the piston.

A conical spring may be inserted between the lower end portion of the piston and the cylinder.

A lower side of the spring seat may be inserted into an upper side of the piston, and at an upper side of the spring seat, a spring bush supporting the end portion of the leaf spring may be provided.

A vehicle height adjuster of the present disclosure for achieving the above object includes: a cylinder fixed to a suspension arm; a piston configured to be inserted into the cylinder and provided to be configured to move upwards and downwards; and a spring seat provided between a leaf spring and the piston so that a lower side of the leaf spring is supported on an upper end portion of the piston.

A protruding end portion may be provided on an external circumferential surface of the piston, and a cylinder cover for sealing an upper side of the cylinder into which the piston is inserted may be provided on the upper side of the cylinder so that linear sliding of the piston is limited by the protruding end portion.

The piston may have a ventilation hole for fluidically-communicating a space formed between the protruding end portion and the cylinder cover with an internal space of the piston.

Two protruding end portions of the piston may be formed adjacent to each other, and between the two protruding end portions, a first guide ring for guiding the linear sliding of the piston with respect to the cylinder may be provided.

The cylinder cover may be provided with a second guide ring for guiding the linear sliding of the piston.

A hydraulic cup may be formed at a lower end portion of the piston so that a center portion of a lower side of the piston maintains a state spaced from the cylinder, even in a state in which the piston is in close contact with a lowermost side of the cylinder, and a flow path of hydraulic pressure supplied to the cylinder may be formed to communicate with inside of the hydraulic cup.

The hydraulic cup may have an external diameter protruding outwardly from a circumferential surface of the piston.

Between the lower end portion of the piston and the cylinder, a conical spring may be interposed to provide an elastic force to the piston for raising the piston.

According to exemplary embodiments of the present disclosure, by allowing the height of a vehicle to be appropriately adjusted in accordance with the design purpose of the vehicle, the external design of the vehicle may be beautifully expressed, the driver's visibility may be secured, and it is possible to improve fuel efficiency, secure driving stability, prevent damage to the vehicle, and improve convenience in getting on or off by adjusting the vehicle height according to the driving situation.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
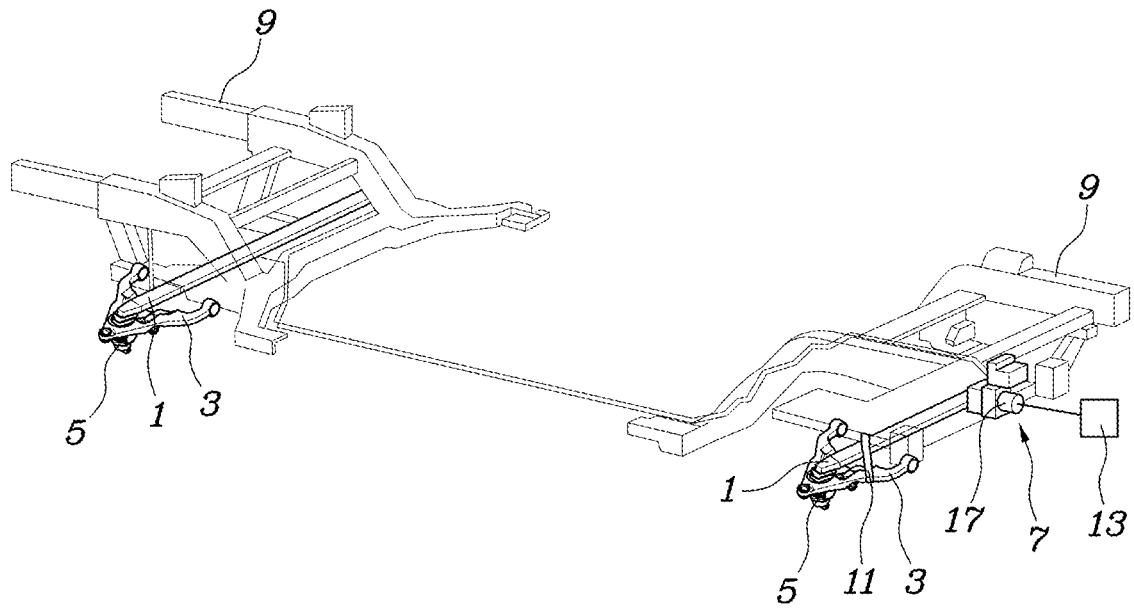
FIG. 1 is a view for explaining the configuration of a vehicle height adjuster according to an exemplary embodiment of the present disclosure.
Figure 2:
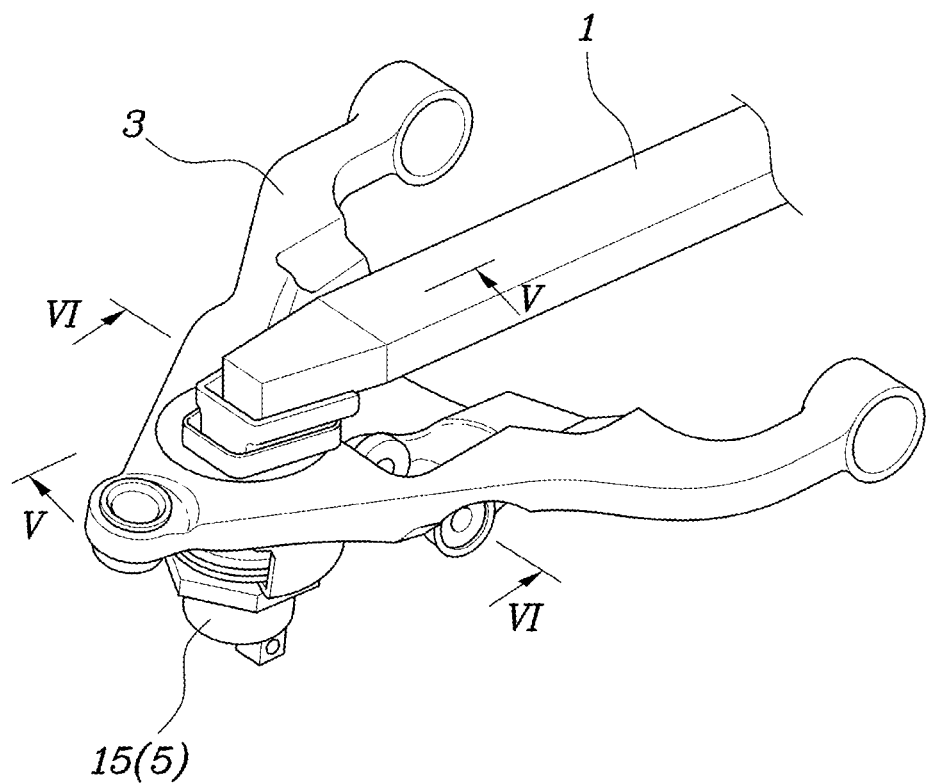
FIG. 2 is a detailed view showing the installation state of an actuator between a suspension arm and a leaf spring.
Figure 3:
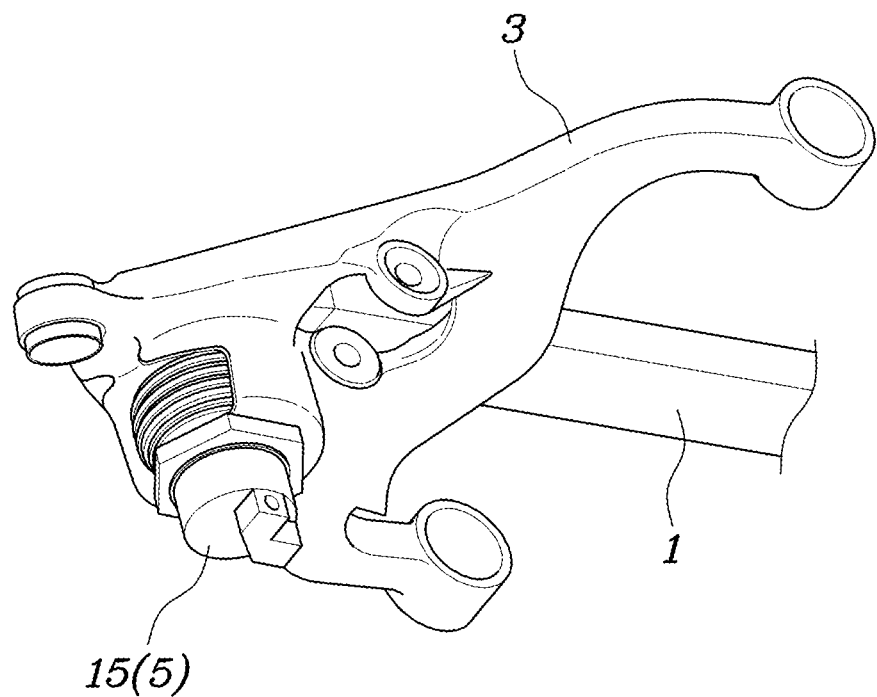
FIG. 3 is a view of FIG. 2 observed from the bottom.
Figure 4:
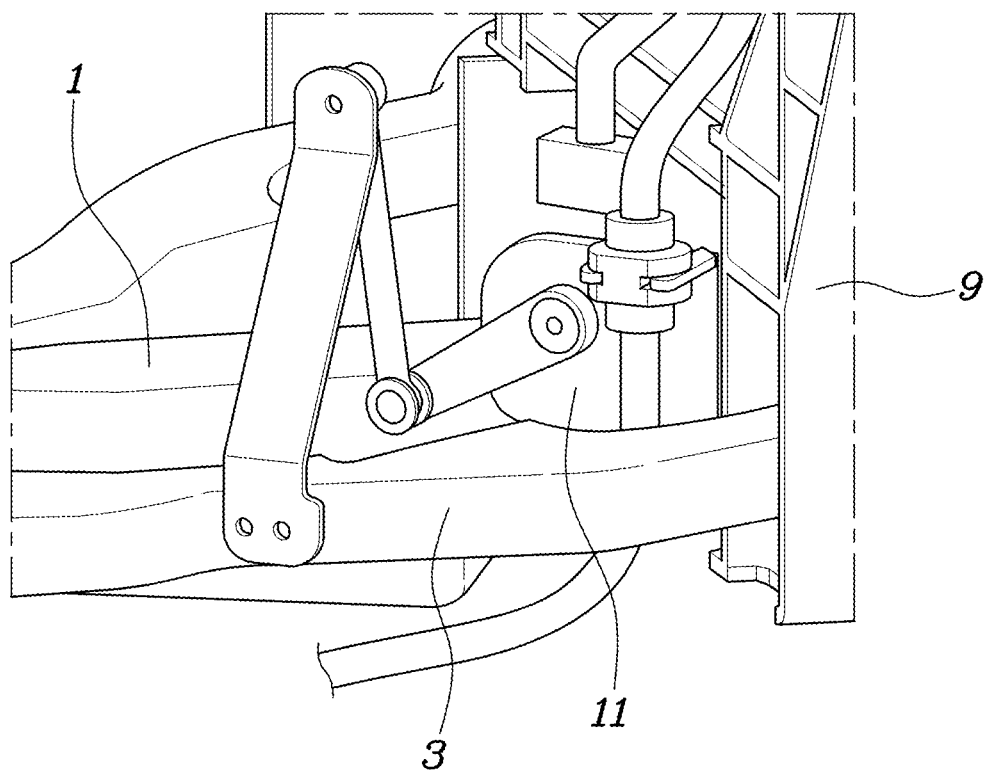
FIG. 4 is a view showing an example of installation of a vehicle height sensor.
Figure 5:
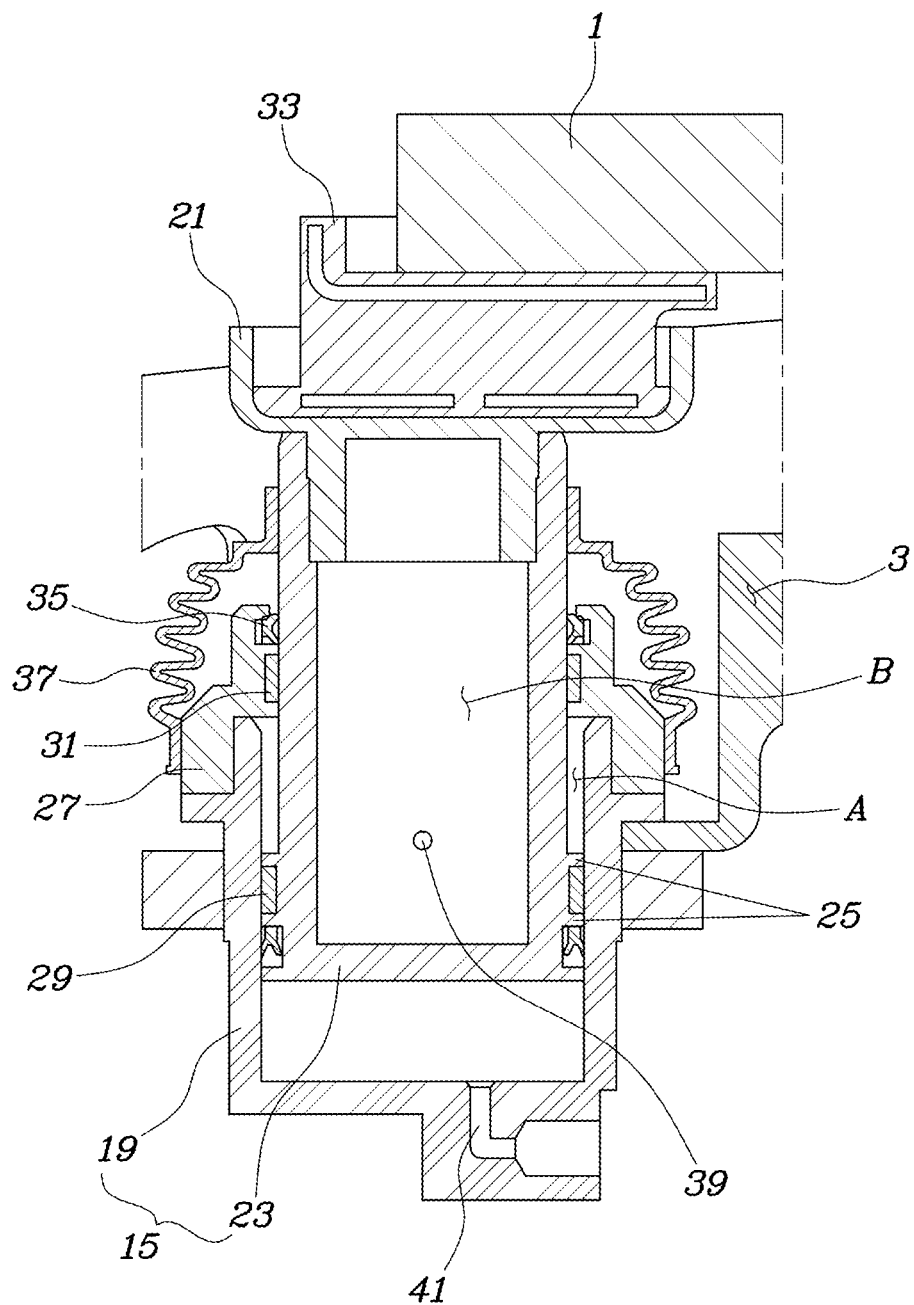
FIG. 5 is a cross-sectional view taken along line V-V of FIG. 2.
Figure 6:
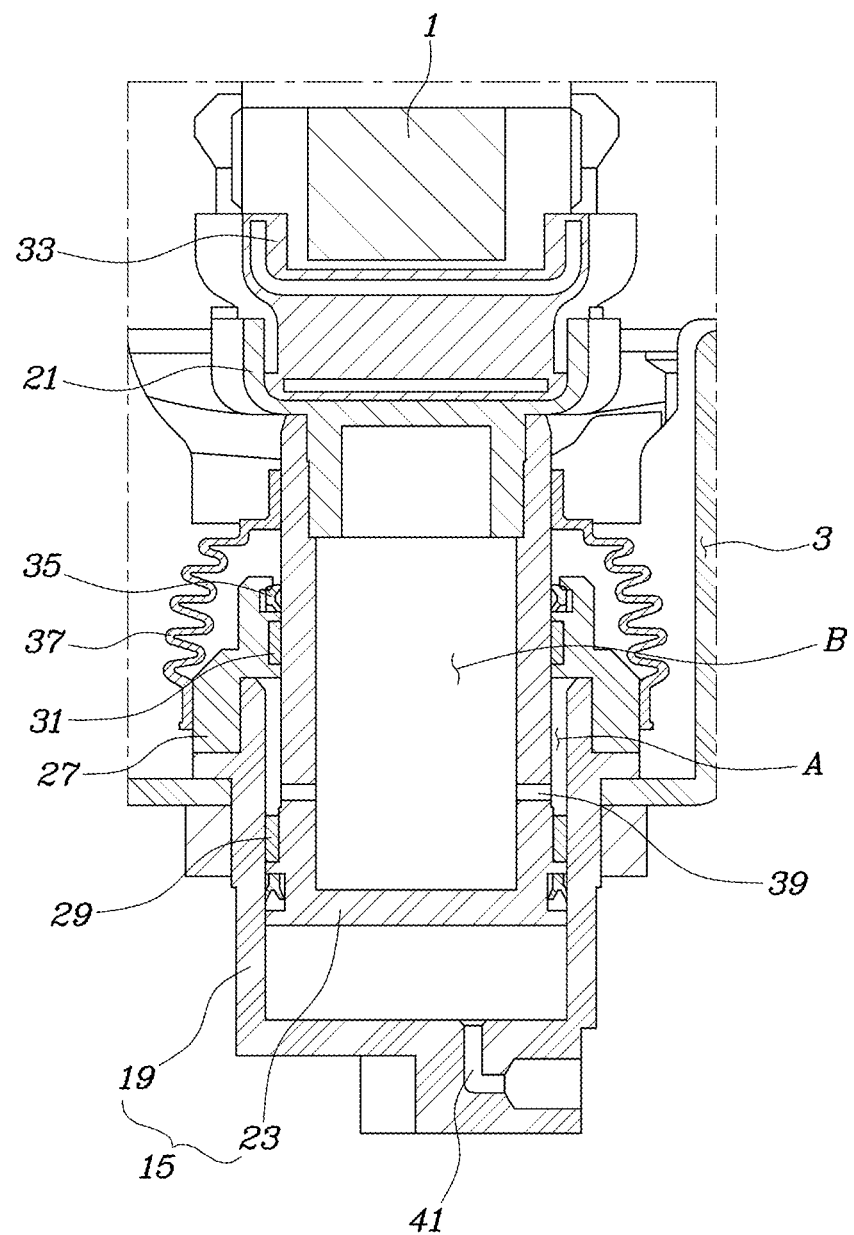
FIG. 6 is a cross-sectional view taken along line VI-VI of FIG. 2.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings, with the same or similar elements being assigned the same reference numerals regardless of numerals used in the drawings, and overlapping descriptions thereof will be omitted.

The suffixes "module" and "part" for the elements used in the following description are provided or mixed in consideration of only the ease of writing the specification, and do not have distinct meanings or roles by themselves.

In describing the exemplary embodiments disclosed in the present specification, if it is determined that detailed descriptions of related known technologies may obscure the gist of the exemplary embodiments disclosed in the present specification, the detailed description thereof will be omitted. Furthermore, it should be understood that the accompanying drawings are only for easy understanding of the exemplary embodiments disclosed in the present specification, and the technical idea disclosed in the present specification is not limited by the accompanying drawings, and the present disclosure covers all changes, equivalents and substitutes within the spirit and scope of the present disclosure.

Terms including an ordinal number, such as first, second, etc., may be used to describe various elements, but the elements are not limited by the terms. These terms are used only for distinguishing one element from another.

When an element is referred to as being "connected" to another element, it should be understood that the other element may be directly connected to the other element, but other element(s) may exist in between. On the other hand, when it is said that a certain element is "directly connected" to another element, it should be understood that no other element is present in the middle.

The singular expression includes the plural expression unless the context clearly dictates otherwise.

In the present specification, the terms "comprise", "include", or "have" are intended to indicate that there is a feature, number, step, action, element, part, or combination thereof described on the specification, and it is to be understood that the present disclosure does not exclude the possibility of the presence or the addition of one or more other features, numbers, steps, actions, elements, parts, or combinations thereof.

Furthermore, a "unit" or "control unit" included in the names of a motor control unit (MCU), a hybrid control unit (HCU), etc. is only a term widely used in naming a controller that is configured to control a specific vehicle function, and does not mean a generic function unit.

The controller may include a communication device that communicates with other controllers or sensors to control the functions in charge, an operating system, a memory that stores logic commands and input/output information, and one or more processors that perform judgments, calculations, decisions, etc. necessary to control the functions in charge.

Referring to FIGS. 1 to 6, a vehicle height adjuster of the present disclosure includes: an actuator 5 provided to form vertical linear displacement between a leaf spring 1 and a suspension arm 3; a power source 7 configured to provide power to drive the actuator 5; a vehicle height sensor 11 provided to detect the change in the height of the suspension arm 3 relative to a vehicle body 9; and a controller 13 configured to receive a signal from the vehicle height sensor 11 and to control the power source 7 to drive the actuator 5.

That is, the vehicle height adjuster of the present disclosure is configured to adjust the vehicle height in a vehicle that utilizes a transverse leaf spring 1 as a suspension spring by making it possible to change the vertical linear displacement between the leaf spring 1 and the suspension arm 3 with the actuator 5.

The controller 13 may control the power source 7 by receiving information such as the driving condition of the vehicle and the road condition through a sensor, and may control the power source 7 even by a user's manipulation to generate a desired vehicle height.

For reference, here, the vehicle body and the frame function as the same rigid body for the elements of the present disclosure, such as the leaf spring 1 and the suspension arm 3, and therefore, will be collectively referred to as the vehicle body 9.

Accordingly, although the frame structure is shown in FIG. 1, it is treated as the vehicle body 9.

In the present exemplary embodiment of the present disclosure, the actuator 5 includes a hydraulic cylinder 15 provided between the leaf spring 1 and the suspension arm 3, and the power source 7 includes a hydraulic pump 17 that generates hydraulic pressure to be provided to the hydraulic cylinder 15.

Of course, as the actuator 5, a configuration such as a motor and a lead screw or a motor and a rack & pinion may be used. In the instant case, the power source 7 may be a power supply device including a battery storing power to be provided to the motor.

For reference, in the present exemplary embodiment of the present disclosure, the suspension arm 3 is a lower arm, and although not shown, an upper arm is provided above the lower arm, and a knuckle of a wheel is supported by the lower arm and the upper arm.

In the present exemplary embodiment of the present disclosure, the hydraulic cylinder 15 includes: a cylinder 19 fixed to the suspension arm 3; and a piston 23 configured for linear sliding up and down in the cylinder 19 and provided with a spring seat 21 for supporting the end portion of the leaf spring 1 on the upper side thereof.

That is, when the piston 23 moves up and down with respect to the cylinder 19, the force for pressing the lower side of the leaf spring 1 upward through the spring seat 21 is configured to change.

Here, because the leaf spring 1 is fixed to the vehicle body 9, and the suspension arm 3 is provided rotatably up and down with respect to the vehicle body 9, the lifting and lowering of the piston 23 with respect to the cylinder 19 as described above causes vertical rotation of the suspension arm 3 rather than deformation of the leaf spring 1, generating an effect of substantially adjusting the height of the vehicle.

At least one protruding end portion 25 is provided on the external circumferential surface of the piston 23, and a cylinder cover 27 is provided on the upper side of the cylinder 19 to restrict the protruding end portion 25 from being separated from the cylinder 19 while guiding the linear sliding of the piston 23.

Accordingly, the piston 23 may only ascend until the protruding end portion 25 comes into contact with the cylinder cover 27 at the maximum.

Such a configuration prevents an unnecessary increase in the length of the actuator 5 to enable the configuration of the compact actuator 5 by implementing the function of a stopper restricting the range of motion of the piston 23 by the protruding end portion 25 and the cylinder cover 27, and makes it possible to implement a stronger moving force of the piston 23 with the same hydraulic pressure by allowing the protruding end portion 25 to substantially enlarge the cross-sectional area to which hydraulic pressure is applied to the lower side of the piston 23.

A first guide ring 29 for guiding the linear sliding of the piston 23 with respect to the cylinder 19 is provided at the protruding end portion 25 of the piston 23, and a second guide ring 31 for guiding the linear sliding of the piston 23 is provided at the cylinder cover 27.

The leaf spring 1 applies a lateral force to the upper side of the spring seat 21 as the leaf spring 1 expands and contracts from the upper side of the spring seat 21 in the transverse direction according to the lifting and lowering of the wheel. At the instant time, the first guide ring 29 and the second guide ring 31 securely maintain the position and posture of the piston 23 with respect to the cylinder 19, so that the linear sliding of the piston 23 with respect to the cylinder 19 is always smoothly performed.

The spring seat 21 is configured so that the lower side thereof is inserted into the upper side of the piston 23, and at the upper side of the spring seat 21, a spring bush 33 supporting the end portion of the leaf spring 1 is provided.

The cylinder cover 27 may further include a dust seal 35 for preventing dust from entering the upper side of the second guide ring 31.

Accordingly, the dust seal 35 prevents foreign substances from penetrating into the gap between the piston 23 and the cylinder cover 27 while allowing the linear movement of the piston 23 with respect to the cylinder cover 27, improving the durability of the cylinder 19 and the piston 23.

Meanwhile, between the cylinder cover 27 and the piston 23, a bellows boot 37 for blocking the gap between the cylinder cover 27 and the piston 23 from the outside thereof while allowing a linear displacement of the piston 23 with respect to the cylinder 19 as in the exemplary embodiment of the present disclosure may be provided.

In the instant case, the dust seal 35 of the cylinder cover 27 may be deleted to make the actuator 5 more compact.

The piston 23 has a ventilation hole 39 for fluidically-communicating the space A between the first guide ring 29 and the cylinder cover 27 with the internal space B of the piston 23.

That is, when the piston 23 rises, the space A between the first guide ring 29 and the cylinder cover 27 is compressed, but when the air in the space A is not discharged, damage to the cylinder 19 or the piston 23 may occur due to excessive pressure build-up, and the piston 23 may not smoothly rise. Therefore, by fluidically-communicating the space A with the internal space B of the piston 23 through the ventilation hole 39, when the piston 23 rises, the air in the space A may move to the internal space B of the piston 23, facilitating easy and smooth rise of the piston 23.

Meanwhile, the cylinder 19 is formed with a flow path 41 to supply hydraulic pressure toward the lower end portion of the piston 23.

Figure 7:
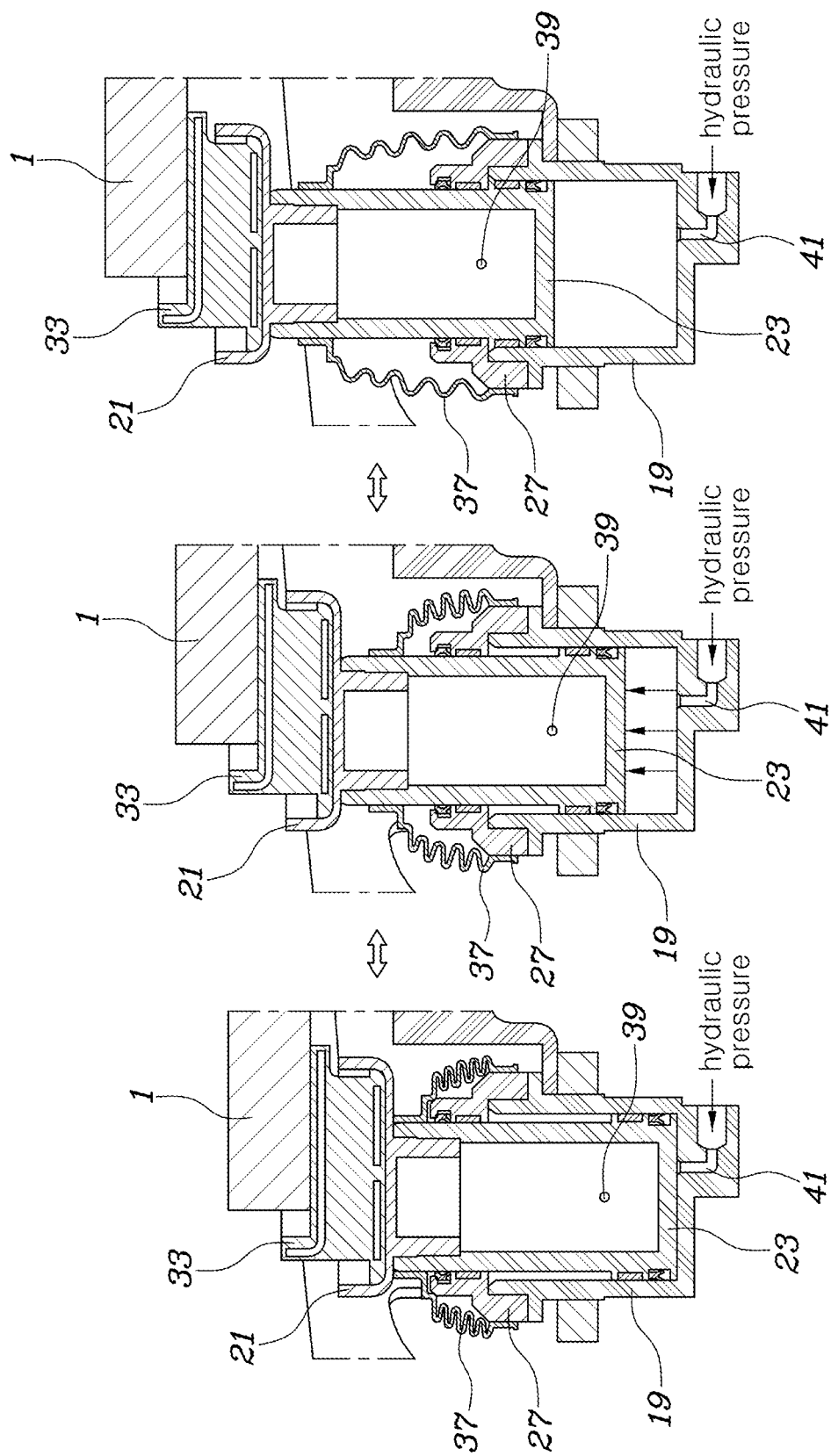
FIG. 7 is a view for explaining the principle of height adjustment by the actuator.

Referring to FIG. 7, when hydraulic pressure is supplied through the flow path 41, the piston 23 rises and the suspension arm 3 gradually rotates downward with respect to the leaf spring 1 to increase the vehicle height.

That is, the height of the vehicle increases toward the right in the drawing.

Conversely, if the hydraulic pressure in the flow path 41 is gradually reduced, the piston 23 descends and the suspension arm 3 gradually rotates upward with respect to the leaf spring 1 to lower the vehicle height.

That is, the height of the vehicle is lowered toward the left in the drawing.

Of course, increasing and decreasing the hydraulic pressure of the flow path 41 may be implemented by the controller 13 controlling the hydraulic pump 17 and a hydraulic valve.

Figure 8:
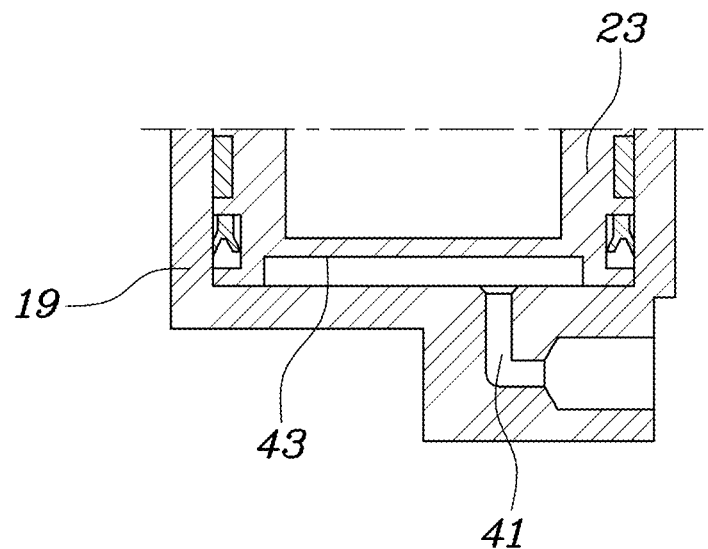
FIG. 8 is a view showing an example in which a hydraulic cup is formed on a piston of the actuator.

FIG. 8 illustrates a modified example of the piston 23 used in the actuator 5. At the lower end portion of the piston 23, a hydraulic cup 43 with a center portion recessed upward is formed, so that the flow path 41 is not blocked by the piston 23 even when the lower end portion of the piston 23 comes into contact with the cylinder 19.

Therefore, even when the piston 23 is completely lowered and is in contact with the cylinder 19, the hydraulic pressure applied to the piston 23 through the flow path 41 is not limited to the cross-sectional area of the opening of the flow path 41, but spreads over the entire lower surface of the hydraulic cup 43, making it possible to prevent the hydraulic pressure acting on the piston 23 from excessively increasing in the initial stage of the upward control of the piston 23.

In other words, by providing the hydraulic cup 43, even when the piston 23 is in contact with the lower side of the cylinder 19, the area on which the hydraulic pressure acts becomes greater than the cross-sectional area of the portion where the flow path 41 is connected to the inside of the cylinder 19, so that the piston 23 may be raised without applying excessive hydraulic pressure.

Figure 9:
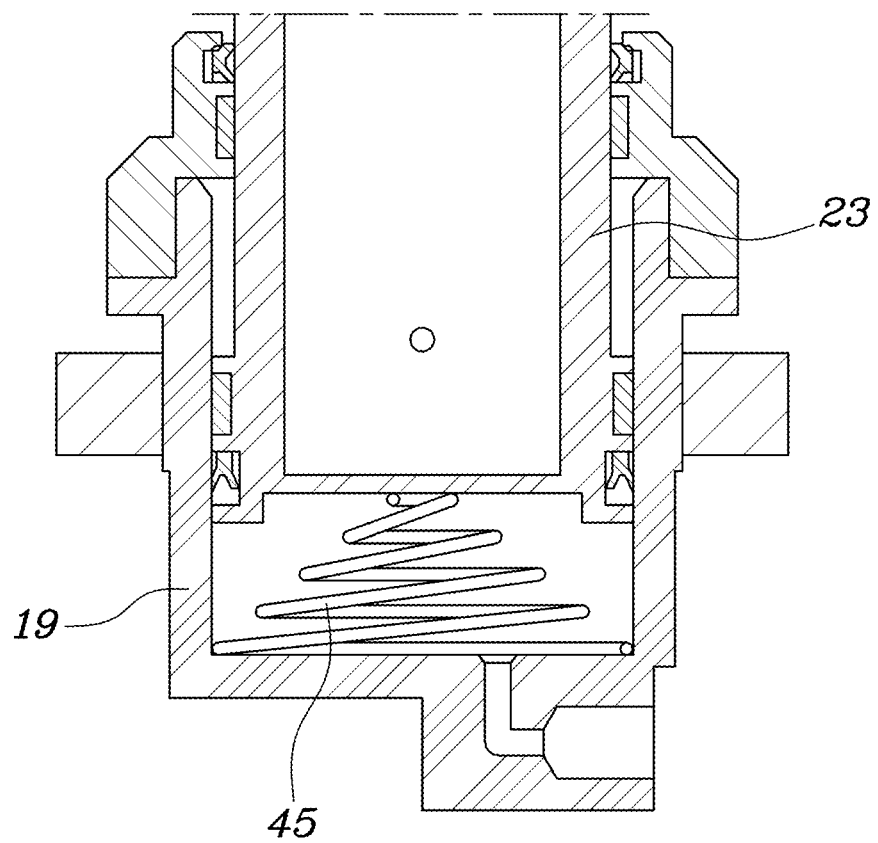
FIG. 9 is a view showing an example in which a conical spring is provided between the piston and a cylinder.

FIG. 9 is a view exemplarily illustrating that a conical spring 45 is inserted between the lower end portion of the piston 23 and the cylinder 19.

In the instant case, the elastic force of the conical spring 45 is added to the hydraulic pressure at the beginning of the rise of the piston 23, so that the hydraulic pressure to be supplied to the cylinder 19 may be lowered by that much.

Furthermore, when the conical spring 45 is compressed by the descent of the piston 23, the compressed height is significantly lower than that of a general coil spring, so that the required stroke of the piston 23 may be secured and the size of the actuator 5 may be configured more compactly.

Meanwhile, the present disclosure as described above may be implemented as follows.

That is, an exemplary embodiment of the vehicle height adjuster of the present disclosure includes: a cylinder 19 fixed to a suspension arm 3; a piston 23 which is inserted into the cylinder 19 and provided to be configured to move up and down; and a spring seat 21 provided between a leaf spring 1 and the piston 23 so that the lower side of the leaf spring 1 is supported on the upper end portion of the piston 23.

A protruding end portion 25 may be provided on the external circumferential surface of the piston 23, and a cylinder cover 27 for sealing the upper side of the cylinder 19 into which the piston 23 is inserted may be provided on the upper side of the cylinder 19 so that linear sliding of the piston 23 is limited by the protruding end portion 25.

The piston 23 may have a ventilation hole 39 for fluidically-communicating the space formed between the protruding end portion 25 and the cylinder cover 27 with the internal space of the piston 23.

Two protruding end portions 25 of the piston 23 may be formed adjacent to each other, and between the two protruding end portions, a first guide ring 29 for guiding the linear sliding of the piston 23 with respect to the cylinder 19 may be provided.

The cylinder cover 27 may be provided with a second guide ring 31 for guiding the linear sliding of the piston 23.

A hydraulic cup 43 may be formed at the lower end portion of the piston 23 so that the center portion of the lower side of the piston 23 maintains a state spaced from the cylinder 19, even in a state in which the piston 23 is in close contact with the lowermost side of the cylinder 19. A flow path 41 of hydraulic pressure supplied to the cylinder 19 may be formed to communicate with the inside of the hydraulic cup 43.

The hydraulic cup 43 may have an external diameter protruding outwardly from the circumferential surface of the piston 23.

In the instant case, because the inside of the hydraulic cup 43 becomes wider, there is an advantage in that the area in which the hydraulic pressure supplied to the flow path 41 acts on the lower side of the piston 23 may be further enlarged.

Between the lower end portion of the piston 23 and the cylinder 19, a conical spring 45 may be interposed to provide an elastic force to the piston for raising the piston 23.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodi-

What is claimed is:

1. A vehicle height adjuster apparatus, comprising:
an actuator provided to form vertical linear displacement between a leaf spring and a suspension arm;
a power source connected to the actuator and configured to provide power to drive the actuator;
a vehicle height sensor provided to detect a change in a height of the suspension arm relative to a vehicle body; and
a controller connected to the vehicle height sensor and the power source and configured to receive a signal from the vehicle height sensor and to control the power source to drive the actuator,
wherein the actuator includes a hydraulic cylinder provided between the leaf spring and the suspension arm,
wherein the power source includes a hydraulic pump configured to generate hydraulic pressure to be provided to the hydraulic cylinder,
wherein the hydraulic cylinder includes:
a cylinder fixed to the suspension arm; and
a piston slidably mounted in the cylinder, configured for linear sliding up and down in the cylinder and provided with a spring seat for supporting an end portion of the leaf spring on an upper side of the piston,
wherein at least one protruding end portion is provided on an external circumferential surface of the piston, and
wherein a cylinder cover is provided on an upper side of the cylinder to restrict the at least one protruding end portion from being separated from the cylinder while guiding the linear sliding of the piston.

2. The vehicle height adjuster apparatus of claim 1, wherein a first guide ring for guiding the linear sliding of the piston with respect to the cylinder is provided at the at least one protruding end portion of the piston, and
wherein a second guide ring for guiding the linear sliding of the piston is provided at the cylinder cover.

3. The vehicle height adjuster apparatus of claim 2, wherein the at least one protruding end portion includes a first protruding end portion and a second protruding end portion on an external circumferential surface of the piston with a predetermined distance therebetween, and
wherein the first guide ring is mounted between the first protruding end portion and the second protruding end portion on the external circumferential surface of the piston.

4. The vehicle height adjuster apparatus of claim 2, wherein the piston has a ventilation hole for fluidically-communicating a space between the first guide ring and the cylinder cover with an internal space of the piston.

5. The vehicle height adjuster apparatus of claim 1, wherein the cylinder cover is further provided with a dust seal for preventing dust from entering an upper side of a second guide ring.

6. The vehicle height adjuster apparatus of claim 1, wherein between the cylinder cover and the piston, a bellows boot for blocking a gap between the cylinder cover and the piston from an outside thereof while allowing a linear displacement of the piston with respect to the cylinder is provided.

7. The vehicle height adjuster apparatus of claim 1, wherein a conical spring is inserted between the lower end portion of the piston and the cylinder.

8. The vehicle height adjuster apparatus of claim 1,
wherein a lower side of the spring seat is inserted into an upper side of the piston, and
wherein at an upper side of the spring seat, a spring bush supporting the end portion of the leaf spring is provided.

9. A vehicle height adjuster apparatus, comprising:
an actuator provided to form vertical linear displacement between a leaf spring and a suspension arm;
a power source connected to the actuator and configured to provide power to drive the actuator;
a vehicle height sensor provided to detect a change in a height of the suspension arm relative to a vehicle body; and
a controller connected to the vehicle height sensor and the power source and configured to receive a signal from the vehicle height sensor and to control the power source to drive the actuator,
wherein the actuator includes a hydraulic cylinder provided between the leaf spring and the suspension arm,
wherein the power source includes a hydraulic pump configured to generate hydraulic pressure to be provided to the hydraulic cylinder,
wherein the hydraulic cylinder includes:
a cylinder fixed to the suspension arm; and
a piston slidably mounted in the cylinder, configured for linear sliding up and down in the cylinder and provided with a spring seat for supporting an end portion of the leaf spring on an upper side of the piston,
wherein the cylinder is formed with a flow path to supply the hydraulic pressure toward a lower end portion of the piston, and
wherein at the lower end portion of the piston, a hydraulic cup with a center portion recessed upward is formed, so that even if the lower end portion of the piston contacts with the cylinder, the flow path is not blocked by the piston.

10. A vehicle height adjuster apparatus, including:
a cylinder fixed to a suspension arm;
a piston inserted into the cylinder and configured to move up and down; and
a spring seat provided between a leaf spring and the piston so that a lower side of the leaf spring is supported on an upper end portion of the piston,
wherein a protruding end portion is provided on an external circumferential surface of the piston, and
wherein a cylinder cover for sealing an upper side of the cylinder into which the piston is inserted is provided on the upper side of the cylinder so that linear sliding of the piston is limited by the protruding end portion.

11. The vehicle height adjuster apparatus of claim 10, wherein the piston has a ventilation hole for fluidically-communicating a space formed between the protruding end portion and the cylinder cover with an internal space of the piston.

12. The vehicle height adjuster apparatus of claim 10, wherein the protruding end portion includes first and second protruding end portions formed adjacent to each other on an external circumferential surface of the piston, and
wherein, between the first and second protruding end portions, a first guide ring for guiding the linear sliding of the piston with respect to the cylinder is provided.

13. The vehicle height adjuster apparatus of claim 12, wherein the cylinder cover is provided with a second guide ring for guiding the linear sliding of the piston.

14. The vehicle height adjuster apparatus of claim 10,
    wherein a hydraulic cup is formed at a lower end portion of the piston so that a center portion of a lower side of the piston maintains a state spaced from the cylinder, even in a state in which the piston is in contact with a lowermost side of the cylinder, and
    wherein a flow path of hydraulic pressure supplied to the cylinder is formed to fluidically-communicate with inside of the hydraulic cup.

15. The vehicle height adjuster apparatus of claim 14, wherein the hydraulic cup has an external diameter protruding outwardly from a circumferential surface of the piston.

16. The vehicle height adjuster apparatus of claim 14, wherein between the lower end portion of the piston and the cylinder, a conical spring is interposed to provide an elastic force to the piston for raising the piston.

* * * * *